United States Patent
You et al.

(10) Patent No.: US 6,828,718 B2
(45) Date of Patent: Dec. 7, 2004

(54) PHOSPHORS HAVING IMPROVED LUMINANCE AND LONG LIFESPAN

(75) Inventors: Young-chul You, Suwon (KR); Kyu-chan Park, Suwon (KR); Sang-hyuk Lee, Anyang (KR); Il Yu, Suwon (KR)

(73) Assignee: Samsung SDI Co., Ltd, Suwon-si (KR)

( * ) Notice: Subject to any disclaimer, the term of this patent is extended or adjusted under 35 U.S.C. 154(b) by 336 days.

(21) Appl. No.: 10/025,876

(22) Filed: Dec. 26, 2001

(65) Prior Publication Data

US 2002/0121855 A1 Sep. 5, 2002

(30) Foreign Application Priority Data

Dec. 29, 2000 (KR) .................................... 2000-86260

(51) Int. Cl.$^7$ .............................. H01J 1/62; H01J 63/04
(52) U.S. Cl. ...................... 313/486; 313/467; 313/468; 313/496; 313/503; 428/690; 252/301.4 F; 427/64; 427/157
(58) Field of Search ................................ 313/486, 467, 313/468, 496, 503; 428/690; 252/301.4 F; 427/64, 157

(56) References Cited

U.S. PATENT DOCUMENTS 5,314,759 A * 5/1994 Harkonen et al. .......... 428/690

5,619,098 A 4/1997 Toki et al. ................. 313/496

OTHER PUBLICATIONS

Abstract of Japanese Patent Publication No. 08–085788 published Apr. 2, 1996.

* cited by examiner

Primary Examiner—Joseph Williams
Assistant Examiner—Kevin Quarterman
(74) Attorney, Agent, or Firm—Staas & Halsey LLP

(57) ABSTRACT

A phosphor compliant with formula (1) below and a perovskite structure containing samarium (Sm):

$$MTiO_3: (A, B) \quad (1)$$

where M is an alkali earth metal, A is an element selected from the group consisting of cerium (Ce), praseodymium (Pr), europium (Eu), terbium (Tb), and thulium (Tm), and B is a Group IIIA element of the periodic table. The phosphor has excellent luminance and lifespan while not containing S in its host matrix, and is also environmentally safe since it does not contain cadmium that is harmful to the environment. Therefore, the phosphor can be advantageously utilized for various display applications including vacuum fluorescent displays (VFDs) and field emission displays (FEDs).

27 Claims, 2 Drawing Sheets

• Ti
● O
● Alkali earth metal

PHOSPHORS HAVING IMPROVED LUMINANCE AND LONG LIFESPAN

CROSS-REFERENCE TO RELATED APPLICATIONS

This application claims the benefit of Korean Application No. 2000-86260, filed Dec. 29, 2000, in the Korean Industrial Property Office, the disclosure of which is incorporated herein by reference.

BACKGROUND OF THE INVENTION

1. Field of the Invention

The present invention relates to phosphors for use in a display device such as a vacuum fluorescent display (VFD) or field emission display (FED).

2. Description of the Related Art

Like cathode ray tubes (CRTs), VFDs are self-radiating displays that use phosphors. VFDs are widely used in applications such as digital displays of household electric appliances and gauge panels of automobiles. VFDs have mainly been used for low-capacity, small-sized products to simply display numbers, characters, and signs. However, VFDs are currently in use for high-density graphic image displays. In the near future, a full color VFD having a large display capacity will become commercially viable.

FEDs have received considerable attention as a next generation display device having the advantages of flat panel displays such as liquid crystal displays (LCDs) and CRTs. Thus, much research on FEDs continues to be actively conducted. FEDs, which operate on the principle of field emission of electrons from microscopic tips, are known to be capable of overcoming the drawbacks of CRTs, such as excessive bulk and weight, and the drawbacks of LCDs, such as high manufacturing cost and limited site and viewing angle. Furthermore, since FEDs have various advantages such as a thin film form, low power consumption, low manufacturing cost, excellent temperature characteristics, and high-speed operation, they can be used in a wide variety of applications ranging from home televisions to industrial equipment and computers. In particular, FEDs are likely to be widely used in commercial applications such as notebook PCs, monitors, and televisions, like thin film transistor (TFT) LCDs.

A phosphor able to be excited by a low-velocity electron beam is required to be used in VFDs or FEDs in order to emit light at an anode operating voltage no greater than 1 kV. Conventional phosphors that are excitable by low-velocity electron beams are divided into two types by the resistance of a host lattice: one is a phosphor based upon a low-resistance host matrix, and the other is a phosphor based upon a high-resistance host matrix and having a phosphor layer formed by adding a conductive material to reduce the resistance of the host matrix.

The host matrix of the latter high-resistance phosphors mostly contain sulfur (S), and thus the sulfur-containing phosphor is referred to as a "sulfide phosphor." It is known that the sulfide phosphor is readily decomposed when bombarded by electrons, and the decomposed sulfide phosphor is scattered within a VFD. The sulfide-based material impinges on a cathode in the VFD, thereby contaminating the cathode and thus degrading the emission power of the VFD. Another problem with the sulfide phosphor is that the sulfide impinges on other oxide phosphors to contaminate an anode. Additionally, a ZnCdS-based host matrix contains a pollutant such as cadmium (Cd), which adversely affects the environment.

To overcome the drawbacks of conventional phosphors, a phosphor prepared by adding a rare earth element and a Group III element to a host matrix composed of alkali earth metal oxide and titanium (Ti) oxide is disclosed in Japanese Patent Laid-open Publication No. Heisei 8-85788 and U.S. Pat. No. 5,619,098, the disclosures of which are incorporated by reference. The phosphor host matrix does not contain sulfur or cadmium (Cd) and is excited by low-velocity electron beams to emit light. However, this phosphor has not yet been put into practice due to its having a short lifespan.

SUMMARY OF THE INVENTION

To solve the above and other problems, it is an object of the present invention to provide a phosphor whose host matrix does not contain sulfur and which has a long lifespan and improved luminance and does not contain cadmium.

Additional objects and advantages of the invention will be set forth in part in the description which follows and, in part, will be obvious from the description, or may be learned by practice of the invention.

Accordingly, to achieve the above and other objects, a phosphor according to an embodiment of the present invention complies with formula (1) below, has a perovskite structure and contains samarium (Sm):

$$MTiO_3: (A, B) \qquad (1)$$

where M is an alkali earth metal, A is an element selected from the group consisting of cerium (Ce), praseodymium (Pr), europium (Eu), terbium (Tb), and thulium (Tm), and B is a Group IIIA element of the periodic table.

According to an aspect of the invention, the alkali earth metal is one of magnesium (Mg), strontium (Sr), calcium (Ca), and barium (Ba).

According to another aspect of the invention, the element denoted by A is selected from the group consisting of Ce, Pr, Eu, Tb, and Tm is added in an amount of 0.05–5 mol % based on 1 mole of the Ti.

According to yet another aspect of the invention, the Group IIIA element is one of aluminum (Al), gallium (Ga), indium (In), and thallium (Tl).

According to still another aspect of the invention, the Group IIIA element is added in an amount of 0.05–80 mol % based on 1 mol of the Ti.

According to yet still another aspect of the invention, the phosphor contains Sm in a range of 0.0001–0.05 mol % based on 1 mol of the Ti.

BRIEF DESCRIPTION OF THE DRAWINGS

The above object and advantages of the present invention will become more apparent and more readily appreciated by describing in detail embodiments thereof with reference to the accompanying drawings in which.

DETAILED DESCRIPTION OF THE EMBODIMENTS

Figure 1:
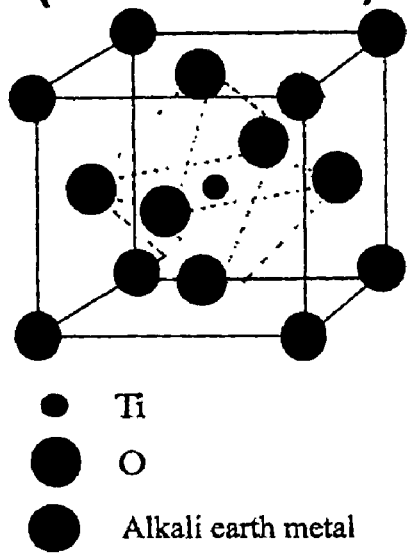
FIG. 1 shows the perovskite structure of a phosphor according to an embodiment of the present invention.

Reference will now be made in detail to the present preferred embodiments of the present invention, examples of which are illustrated in the accompanying drawings and the specific examples, wherein like reference numerals refer to the like elements throughout. The embodiments are described below in order to explain the present invention by referring to the figures and specific examples.

A phosphor having improved luminance and longer lifespan according to an embodiment of the present invention is prepared by adding samarium (Sm) to a conventional phosphor that includes a rare earth element and a Group IIIA element (i.e., a group 13 element according to the new IUPA agreement) in a host matrix composed of an alkali earth metal oxide and a titanium oxide. In the present invention, the Sm is added in an amount of 0.0001–0.05 mol % based on 1 mol of titanium (Ti). If the amount of Sm is less than 0.0001 mol %, the addition of Sm is not effective. If the amount of Sm exceeds 0.05 mol %, the lifespan of the phosphor degrades.

The phosphor according the present invention has a cubic perovskite structure, as shown in FIG. 1. In particular, the Ti is located at a center of the cubic perovskite structure, the alkali earth metal is located on vertices, and the oxygen is located at a center of each face of the structure. Although not illustrated in FIG. 1, the rare earth element serves as an activator and is located at the vertices by partially replacing the alkali earth metal.

When the phosphor having the structure described above is excited by external light, the light energy is absorbed by the Ti, which, in turn transfers the light energy to the alkali earth metal located at the vertices of the cubic perovskite structure to emit the light. The activator substitute at the vertices considerably affects the light emission.

The phosphor according to the present invention is improved in luminescent and lifespan characteristics by the addition of Sm to a conventional phosphor. The phosphor has the perovskite structure based on the most matrix formed of an alkali earth metal oxide, and a Ti oxide and contains Ce, Pr, Eu, Tb, or Tm and a Group IIIA element of the period, c table. In particular, the Sm added is considered to improve the luminescent characteristics by partially replacing one of the alkali earth metal and the activator located at the vertices of the perovskite structure.

The phosphor according to an embodiment of the present invention is prepared by a typical phosphor preparation method. For example, a compound containing Sm, such as $Sm_2O_3$, is mixed with $SrCO_3$, $TiO_2$, $Al(OH)_3$, and $PrCl_3$ and ground in an alumina mortar. The resultant mixture is sintered at a temperature of about 1,000–1,500° C. for about 1–12 hours to obtain the phosphor according to an embodiment of the present invention.

The phosphor according to the present invention has excellent luminance and lifespan while not containing S in its host matrix, and is also environmentally friendly since it does not contain cadmium that is harmful to the environment.

Hereinafter, embodiments of the present invention will be described in detail using specific examples. However, it is understood that the invention is not restricted by the examples which are given for the purposes of illustrating the present invention.

EXAMPLE 1

1 mol of $SrCO_3$, 1 mol of $TiO_2$, 23 mol % $Al(OH)_3$, 0.5 mol % $PrCl_3$, and 0.002 mol % $Sm_2O_3$ were mixed and ground in an alumina mortar and sintered at a temperature of 1,200° C. for 3 hours to obtain a phosphor.

EXAMPLE 2

1 mol of $SrCO_3$, 1 mol of $TiO_2$, 23 mol % $Al(OH)_3$, 0.5 mol % $PrCl_3$, and 0.02 mol % $Sm_2O_3$ were mixed and ground in an alumina mortar and sintered at a temperature of 1,200° C. for 3 hours to obtain a phosphor.

COMPARATIVE EXAMPLE 1

1 mol of $SrCO_3$, 1 mol of $TiO_2$, 23 mol % $Al(OH)_3$, and 0.5 mol % $PrCl_3$ were mixed and ground in an alumina mortar and sintered at 1,200° C. for 3 hours to obtain a phosphor.

COMPARATIVE EXAMPLE 2

1 mol of $SrCO_3$, 1 mol of $TiO_2$, 23 mol % $Al(OH)_3$, 0.5 mol % $PrCl_3$, and 0.07 mol % $Sm_2O_3$ were mixed and ground in an alumina mortar and sintered at 1,200° C. for 3 hours to obtain a phosphor.

The phosphor compositions for Examples 1 and 2 and Comparative Examples 1 and 2 are shown in Table 1.

TABLE 1

| | Example | | Phosphor Composition | | | |
| --- | --- | --- | --- | --- | --- | --- |
| | | | Example 1 | Example 2 | Comparative Example 1 | Comparative Example 2 |
| Alkali earth metal | Compound | | $SrCO_3$ | $SrCO_3$ | $SrCO_3$ | $SrCO_3$ |
| | Content (mol) | | 1 | 1 | 1 | 1 |
| Ti oxide | Compound | | $TiO_2$ | $TiO_2$ | $TiO_2$ | $TiO_2$ |
| | Content (mol) | | 1 | 1 | 1 | 1 |
| Group IIIA element | Compound | | $Al(OH)_3$ | $Al(OH)_3$ | $Al(OH)_3$ | $Al(OH)_3$ |
| | Content (mol %) | | 23 | 23 | 23 | 23 |
| Rare earth element | Compound | | $PrCl_3$ | $PrCl_3$ | $PrCl_3$ | $PrCl_3$ |
| | Content (mol %) | | 0.5 | 0.5 | 0.5 | 0.5 |

TABLE 1-continued

Phosphor Composition

| Example | | Example 1 | Example 2 | Comparative Example 1 | Comparative Example 2 |
|---|---|---|---|---|---|
| Additive | Compound | $Sm_2O_3$ | $Sm_2O_3$ | None | $Sm_2O_3$ |
| | Content (mol %) | 0.002 | 0.02 | — | 0.07 |
| Sintering temperature (° C.) | | 1,200 | 1,200 | 1,200 | 1,200 |
| Sintering time (hour) | | 3 | 3 | 3 | 3 |

Figure 2:
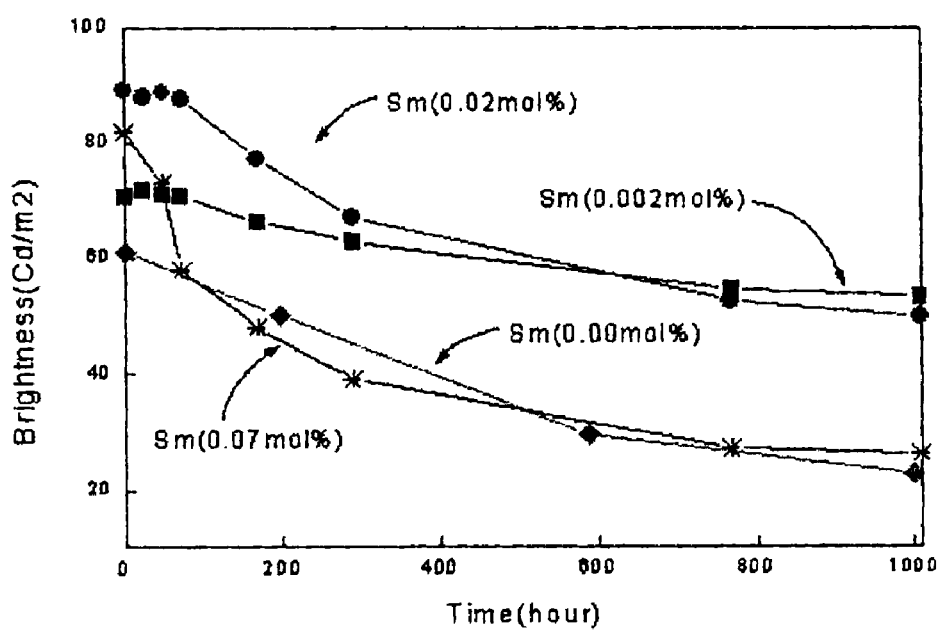
FIG. 2 shows the initial luminance and the luminance variation with time for phosphors prepared in Examples 1 and 2 and Comparative Examples 1 and 2 with respect to the amount of samarium (Sm) according to embodiments of the present invention.

The phosphors prepared in Examples 1 and 2 and Comparative Examples 1 and 2 were evaluated for the initial luminance and the luminance variation with time (lifetime). The results are shown in FIG. 2. As shown in FIG. 2, the phosphors of Examples 1 and 2 that contain Sm showed a higher initial luminance and less luminance variation with time, as compared to the phosphor containing no Sm. In contrast, the phosphor of Comparative Example 2, which contains 0.07 mol % Sm, showed a relatively high initial luminance but showed a sharp reduction in luminance with time. This result confirms that the addition of excess Sm adversely affects the lifespan of the phosphors.

Figure 3:
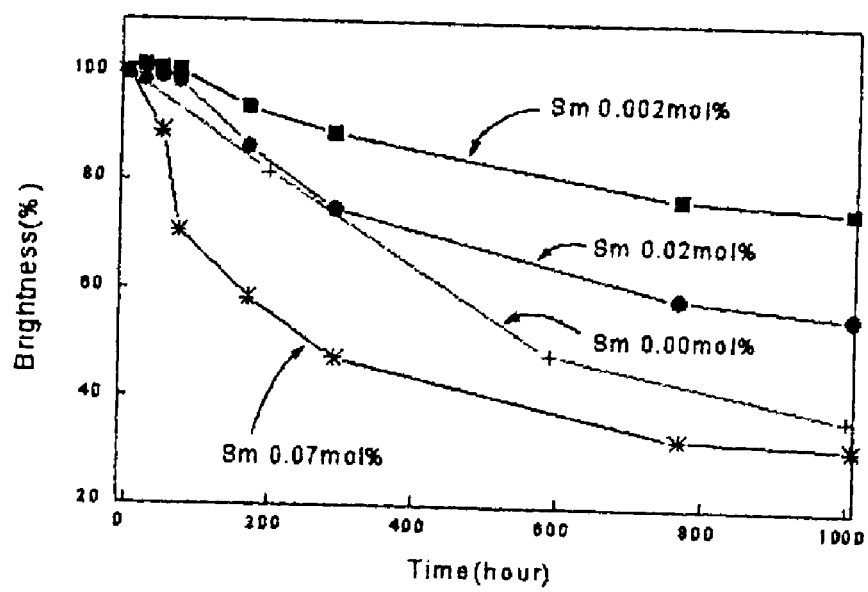
FIG. 3 shows the remaining luminance ratio for the phosphors prepared in Examples 1 and 2 and Comparative Examples 1 and 2 with respect to the amount of Sm according to embodiments of the present invention.

FIG. 3 is a graph illustrating the remaining luminance ratio after 1000 hours of operation for the phosphors prepared in Examples 1 and 2 and Comparative Examples 1 and 2. The 1000-hr remaining luminance ratio is defined by a percentage of the remaining luminance measured after 1,000 hours of operation with respect to the initial luminance of the phosphor. The phosphors of Examples 1 and 2 contains an appropriate amount of Sm and show a higher remaining luminance ratio than the phosphor that does not contain Sm (Comparative Example 1) or which contains excess Sm (Comparative Example 2).

Figure 4:
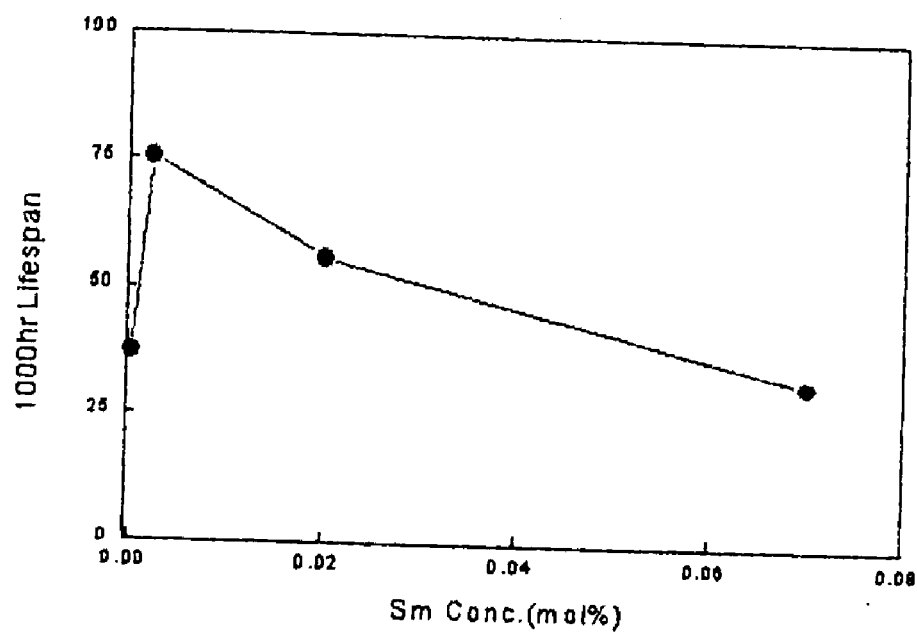
FIG. 4 shows the 1000-hr remaining luminance ratio of the phosphors with respect to the amount of Sm according to embodiments of the present invention.

FIG. 4 is a graph illustrating the 1000-hr remaining luminance ratio for the phosphors prepared in Examples 1 and 2 and Comparative Examples 1 and 2 with respect to the amount of Sm. The 1000-hr remaining luminance ratio was excellent for the phosphors of Examples 1 and 2, which contain an appropriate amount of Sm, as compared to the phosphor that does not contain Sm (Comparative Example 1) or which contains excess Sm (Comparative Example 2).

As described above, the phosphor according to the present invention has excellent luminance and lifespan while not containing S in its host matrix, and is also environmentally safe since it does not contain cadmium that is harmful to the environment. Therefore, the phosphor according to the present invention can be advantageously utilized for various display applications including, but not limited to, vacuum fluorescent displays (VFDs) and field emission displays (FEDs).

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A phosphor comprising:
  a perovskite structure; and
  samarium (Sm) at least partially replacing an element on one of vertices of the perovskite structure,
  wherein said perovskite structure comprises $MTiO_3$: (A, B), where M is an alkali earth metal, A is an element selected from the group consisting of cerium (Ce), praseodymium (Pr), europium (Eu), terbium (Tb), and thulium (Tm), and B is a Group IIIA element of the periodic table.

2. The phosphor of claim 1, wherein the alkali earth metal is an element selected from the group consisting of magnesium (Mg), strontium (Sr), calcium (Ca), and barium (Ba).

3. The phosphor of claim 1, wherein the element A is added in an amount of 0.05–5 mol% based on 1 mole of the Ti.

4. The phosphor of claim 1, wherein the Group IIIA element is an element selected from the group consisting of aluminum (Al), gallium (Ga), indium (In), and thallium (Tl).

5. The phosphor of claim 1, wherein the Group IIIA element is added in an amount of 0.05–80 mol% based on 1 mol of the Ti.

6. The phosphor of claim 1, wherein the amount of said Sm is in a range of 0.0001–0.05 mol% based on 1 mol of the Ti.

7. The phosphor of claim 1, wherein an amount of said Sm is such that a luminescence of the phosphor at 1000 hours of usage is at least 40% of an initial luminescence.

8. The phosphor of claim 7, wherein the amount is such that the luminescence at 1000 hours of usage is at least 70% of the initial luminescence.

9. The phosphor of claim 1, wherein an amount of said Sm is such that an initial luminescence is at least 65 $Cd/m^2$.

10. The phosphor of claim 7, wherein the amount is such that the initial luminescence is at least 65 $Cd/m^2$.

11. The phosphor of claim 7, wherein the amount is such that a luminescence at 600 hours of usage is at least 60% of the initial luminescence.

12. A phosphor comprising:
  a perovskite structure; and
  samarium (Sm) at least partially replacing an element on one of vertices of the perovskite structure,
  wherein an amount of said Sm is such that a luminescence of the phosphor at 1000 hours of usage is at least 40% of an initial luminescence.

13. The phosphor of claim 12, wherein the amount is such that the luminescence at 1000 hours of usage is at least 70% of the initial luminescence.

14. The phosphor of claim 12, wherein the amount is such that the initial luminescence is at least 65 $Cd/m^2$.

15. The phosphor of claim 13, wherein the amount is such that the initial luminescence is at least 65 $Cd/m^2$.

16. The phosphor of claim 12, wherein the amount is such that a luminescence at 600 hours of usage is at least 60% of the initial luminescence.

17. The phosphor of claim 12, wherein said perovskite structure comprises $MTiO_3$: (A, B), where M is an alkali earth metal, A is an element selected from the group consisting of cerium (Ce), praseodymium (Pr), europium (Eu), terbium (Tb), and thulium (Tm), and B is a Group IIIA element of the periodic table.

18. The phosphor of claim 17, wherein the amount of said Sm is at least 0.0001 mol % based on 1 mol of the Ti.

19. The phosphor of claim 18, wherein the amount of said Sm is less than 0.05 based on 1 mol of the Ti.

20. The phosphor of claim 17, wherein the amount of said Sm is roughly at or between 0.002 and 0.02 mol% based on 1 mol of the Ti.

21. A fluorescent display device comprising the phosphor according to claim 1.

22. The fluorescent display device of claim 21, wherein the fluorescent display device is one of a field emission display and a vacuum fluorescent display.

23. A fluorescent display device comprising the phosphor A according to claim 12.

24. A phosphor comprising:

a perovskite structure; and samarium (Sm) at least partially replacing an element on one of vertices of the perovskite structure, wherein:

said perovskite structure comprises $MTiO_3$: (A, B), where M is an alkali earth metal, A is an element selected from the group consisting of cerium (Ce), praseodymium (Pr), europium (Eu), terbium (Tb), and thulium (Tm), and B is a Group IIIA element of the periodic table, and an amount of said Sm is at least 0.0001 mol % based on 1 mol of the Ti.

25. The phosphor of claim 24, wherein the amount of said Sm is less than 0.05 based on 1 mol of the Ti.

26. The phosphor of claim 24, wherein the amount of said Sm is roughly at or between 0.002 and 0.02 mol% based on 1 mol of the Ti.

27. The phosphor of claim 24, wherein the phosphor is produce by mixing the samarium (Sm) or a compound containing the Sm, the titanium (Ti) or a compound containing the Ti, the alkali earth metal or a compound containing the alkali earth metal, and the element selected from the group consisting of cerium (Ce), praseodymium (Pr), europium (Eu), terbium (Tb), and thulium (Tm), and a Group IIIA element of the periodic table or a compound containing the element to obtain a resultant mixture;

sintering the resultant mixture to form the perovskite structure containing the Sm and where the perovskite structure comprises the $MTiO_3$: (A, B).

* * * * *

UNITED STATES PATENT AND TRADEMARK OFFICE
CERTIFICATE OF CORRECTION

PATENT NO. : 6,828,718 B2
DATED : December 7, 2004
INVENTOR(S) : Young-chul You et al.

It is certified that error appears in the above-identified patent and that said Letters Patent is hereby corrected as shown below:

Column 7,
Line 14, delete "A".

Signed and Sealed this

Thirty-first Day of May, 2005

JON W. DUDAS
*Director of the United States Patent and Trademark Office*